United States Patent
Ogundare et al.

(10) Patent No.: US 11,513,247 B2
(45) Date of Patent: Nov. 29, 2022

(54) DATA ACQUISITION SYSTEMS

(71) Applicant: HALLIBURTON ENERGY SERVICES, INC., Houston, TX (US)

(72) Inventors: Oluwatosin Ogundare, Katy, TX (US); Claudio Olmi, Houston, TX (US); David Bennett, Conroe, TX (US); Terry Bickley, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 441 days.

(21) Appl. No.: 16/669,096

(22) Filed: Oct. 30, 2019

(65) Prior Publication Data

US 2021/0132244 A1    May 6, 2021

(51) Int. Cl.
*G01V 1/22* (2006.01)
*G01V 1/00* (2006.01)

(52) U.S. Cl.
CPC .............. *G01V 1/22* (2013.01); *G01V 1/005* (2013.01)

(58) Field of Classification Search
CPC ................................. G01V 1/22; G01V 1/005
See application file for complete search history.

(56) References Cited

U.S. PATENT DOCUMENTS

| | | | | |
|---|---|---|---|---|
| 5,400,298 A | * | 3/1995 | Hepp | G01V 1/201 |
| | | | | 174/101.5 |
| 5,850,369 A | | 12/1998 | Rorden et al. | |
| 7,042,367 B2 | * | 5/2006 | Gardner | G01V 11/00 |
| | | | | 340/853.3 |
| 10,677,946 B2 | * | 6/2020 | Morris | G01V 1/38 |
| 11,269,093 B2 | * | 3/2022 | Amundsen | G01V 3/00 |
| 2008/0137474 A1 | | 6/2008 | Dashevskiy et al. | |
| 2009/0225630 A1 | | 9/2009 | Zheng et al. | |
| 2014/0270033 A1 | | 9/2014 | Richards | |

FOREIGN PATENT DOCUMENTS

WO    2016183286 A1    11/2016

OTHER PUBLICATIONS

S. Wehr, I. Kozintsev, R. Lienhart and W. Kellermann, "Synchronization of acoustic sensors for distributed ad-hoc audio networks and its use for blind source separation," IEEE Sixth International Symposium on Multimedia Software Engineering, Miami, FL, USA, 2004, pp. 18-25.—doi:10.1109/MMSE.2004.79.

(Continued)

*Primary Examiner* — Elias Desta
(74) *Attorney, Agent, or Firm* — Novak Druce Carroll LLP

(57) ABSTRACT

A master data acquisitions system is provided. A trigger emits a sync signal to be sensed by each of a plurality of data acquisition systems. A controller is communicatively coupled with each of the plurality of data acquisition systems. The controller receives data from each of the data acquisition systems. The data for each of the plurality of data acquisition systems include the sensed sync signal. The controller synchronizes the data from each of the plurality of data acquisition systems by aligning the sensed sync signal for each of the plurality of data acquisition systems.

20 Claims, 7 Drawing Sheets

(56) References Cited

OTHER PUBLICATIONS

A. Tan, Y. Peng, X. Su, H. Tong, Q. Deng, "A Novel Synchronization Scheme Based on a Dynamic Superframe for an Industrial Internet of Things in Underground Mining", Sensors, 2019, 19(3), pp. 504.
J. E. Elson, "Time Synchronization in Wireless Sensor Networks," PhD Dissertation, University of California, 2003.
Y. Guo, Y. Liu, "Time Synchronization for Mobile Underwater Sensor Networks," Journal of Networks, vol. 8, No. 1, Jan. 2013.
A. A. Syed and J. Heidemann, "Time Synchronization for High Latency Acoustic Networks," Proceedings IEEE INFOCOM 2006. 25th IEEE International Conference on Computer Communications, Barcelona, 2006, pp. 1-12; abstract only.
International Search Report and Written Opinion for International application No. PCT/US2019/058922, dated Jul. 28, 2020, 14 pages.

* cited by examiner

DATA ACQUISITION SYSTEMS

FIELD

The present disclosure relates generally to data acquisition systems. In at least one example, the present disclosure relates to synchronizing data acquisition systems.

BACKGROUND

Wellbores are drilled into the earth for a variety of purposes including accessing hydrocarbon bearing formations. A variety of downhole tools may be used within a wellbore in connection with accessing and extracting such hydrocarbons. Data acquisition systems may take measurements and/or receive data, for example about the downhole tools, the formation, and/or the fluids therein. A plurality of different data acquisition systems may be utilized to obtain data of different locations and/or processes.

BRIEF DESCRIPTION OF THE DRAWINGS

Implementations of the present technology will now be described, by way of example only, with reference to the attached figures, wherein.

DETAILED DESCRIPTION

Figure 1A:
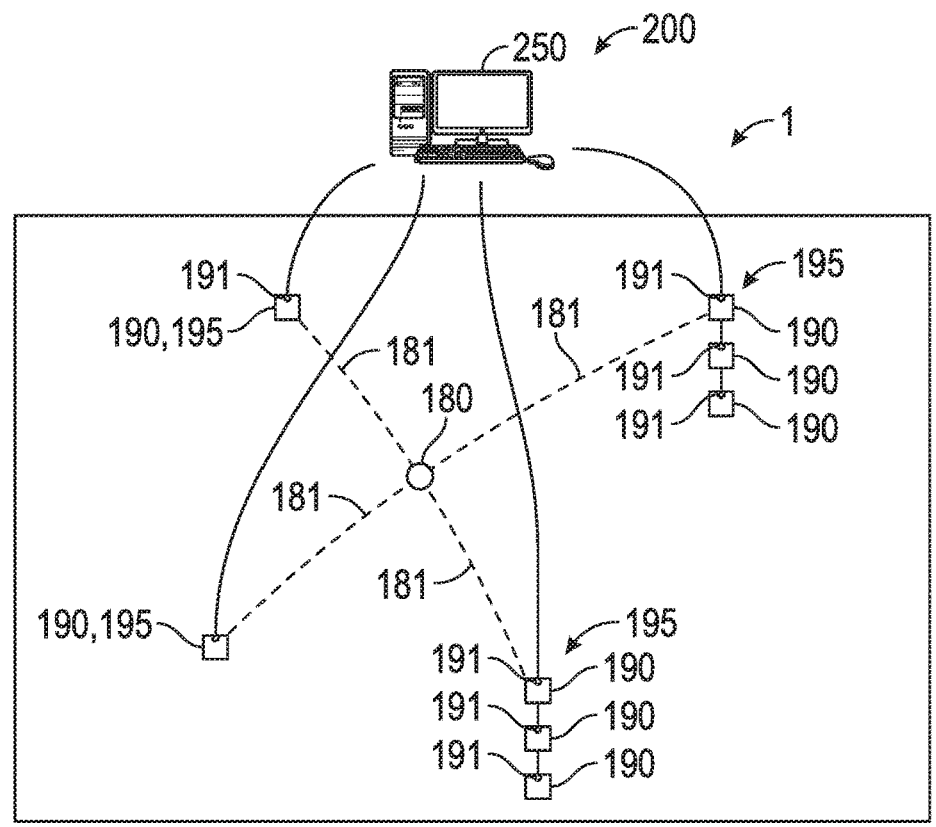
FIG. 1A is a diagram illustrating an exemplary environment for a master data acquisition system according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Disclosed herein is a system to receive and process data from a plurality of data acquisition systems which may be temporally misaligned, for example due to distance. A master data acquisition system includes a trigger which emits a sync signal to each of the plurality of data acquisition systems. The sync signal can include an acoustic signal such as an acoustic pulse, an ultrasound signal and/or a pressure wave. The sync signal can be transmitted within a transmission line to the respective data acquisition system. The transmission line can be substantially homogenous, such as fluid, rock, metal, and/or concrete.

Each of the data acquisition systems includes a signal sensor which senses the sync signal, and adds the sync signal to the data obtained by the data acquisition systems. The master data acquisition system includes a controller which receives data from each of the plurality of data acquisition systems. The data from each of the plurality of data acquisition systems includes the sync signal. The controller then synchronizes the data from each of the plurality of data acquisition systems by aligning the sensed sync signal for each of the data acquisition systems. Accordingly, the data and events from each of the data acquisition systems are temporally aligned to be analyzed and/or utilized by a user.

The system can be employed in an exemplary environment 1 shown, for example, in FIG. 1A. A master data acquisition system 200 includes a controller 250 communicatively coupled with each of a plurality of data acquisition systems 195. The controller 250 communicates with each of the data acquisition systems 195 and receives data from each of the plurality of data acquisition systems 195. FIG. 1A illustrates that the master data acquisition system 200 is communicatively coupled with four data acquisition systems 195. In other examples, the master data acquisition system 200 can be communicatively coupled with two, three, or more data acquisition systems 195. Each of the data acquisition systems 195 measures, receives, transmits, and/or processes data. For example, each of the data acquisition systems 195 includes one or more sensors 190 communicatively coupled with one another. As illustrated in FIG. 1A, two of the four data acquisition systems 195 include three sensors 190 while two of the data acquisition systems 195 include one sensor. In other examples, each of the data acquisition systems 195 can include any number of sensors 190 such as one, two, or more sensors 190 as desired. Each of the sensors 190 measure parameters related to the relevant features at its location. For example, the sensors 190 may measure temperature, pressure, and/or acoustics of a formation or a wellbore, as discussed further in FIGS. 2A-2C.

The plurality of data acquisition systems 195 may be disposed in extreme environments, for example exposed to long distances and/or high interference, from the master data acquisition system 200. As the distance from the master data acquisition system 200 increases, it may be necessary for each of the data acquisition systems 195 to acquire the data locally and then send the data to the master data acquisition system 200 in a digital format via wired cable or wirelessly. Delays in the wired and/or wireless transmission may be affected depending on data acquisition rate and/or distance. The data acquisition systems 195 may be plagued by loss of data acquisition synchronization, for example due to sensor device onboard hardware clock skew. Accordingly, as the data acquisition systems 195 may be disposed in extreme environments from the master data acquisition system 200, wired cable and/or wireless communication via ether may not be available or feasible. For example, when the distance between the data acquisition system 195 and the master data acquisition system 200 is over one kilometer, it is no longer practical to use cables. However, each of the data acquisition systems 195 may be coupled to a transmission line 181. In at least one example, the transmission line 181 may be substantially homogenous. For example, the transmission line 181 may include at least one of the following: fluid, rock, metal, and/or concrete. In some examples, the transmission line 181 can be the same for each of the data acquisition systems 195. In some examples, each or any number of the data acquisition system 195 may be connected to different transmission lines 181.

Figure 1B:
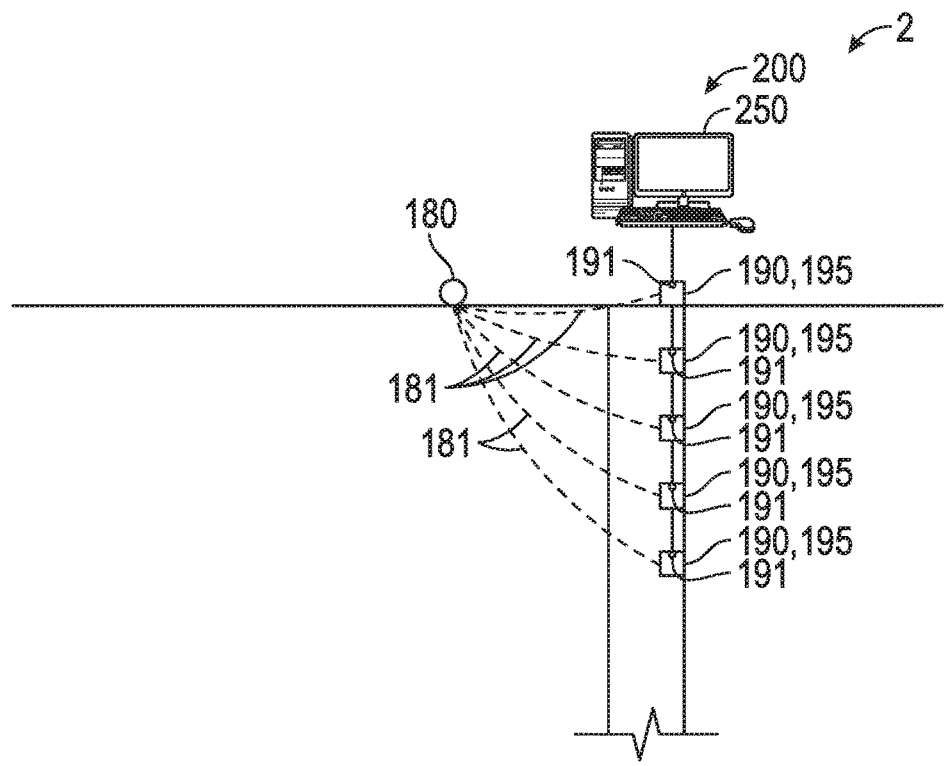
FIG. 1B is a diagram illustrating another exemplary environment for a master data acquisition system.

As illustrated in FIG. 1A, each of the data acquisition systems 195 are separated from one another laterally. As illustrated in FIG. 1B, each of the data acquisition systems 195 are separated vertically in the environment 2. In some examples, the data acquisition systems 195 can be separated both laterally and vertically in any combination. Additionally, in some examples, the data acquisition systems 195 may be obliquely separated. As the distances and/or environments become more extreme, the data needs to be synchronized ex post facto when being processed by the master data acquisition system 200.

The master data acquisition system 200 includes a trigger 180 operable to emit a sync signal to be sensed by each of the plurality of data acquisition systems 195. In at least one example, the trigger 180 can be communicatively coupled with the controller 250 such that the controller 250 receives the timing that the sync signal is emitted. In at least one example, the controller 250 may instruct the trigger 180 to emit the sync signal. Each of the plurality of data acquisition systems 195 includes a signal sensor 191 operable to receive the sync signal. As illustrated in FIGS. 1A and 1B, each sensor 190 of the data acquisition systems 195 includes a signal sensor 191. In other examples, the data acquisition system 195 may only have one signal sensor 191, as data for sensors 190 within each individual data acquisition system 195 is synchronized.

In at least one example, the sync signal includes an acoustic signal. In some examples, the acoustic sync signal can include at least one of the following: an acoustic pulse, an ultrasound signal, and/or a pressure wave. In some examples, the trigger 180 can include a single low latency projector that generates a sync signal within the transmission lines 191. For example, the trigger 180 can include a piezoceramic actuator that emits the sync signal within a transmission line 181 including concrete. The sync signal passes through the concrete to the signal sensor 191 of the data acquisition system 195 in communication with the concrete transmission line 181. The trigger 180 is operable to emit a sync signal such that the sync signal passes through the transmission lines 181 to each of the plurality of data acquisition systems 195.

The controller 250 of the master data acquisition system 200 then receives data from each of the plurality of data acquisition systems 195. The data from each of the data acquisition systems 195 includes the sensed sync signal. The controller 250 of the master data acquisition system 200 synchronizes the data from each of the data acquisition systems 195 by aligning the sensed sync signal for each of the plurality of data acquisition systems 195. In some examples, the synchronization of the data by the controller 250 can include shifting the data from each of the data acquisition systems 195, trimming the data, and/or combining the data. Accordingly, the master data acquisition system 200 can be analyzed in such a way that the events or measurements for each of the data acquisition systems 195 are temporally aligned.

In at least one example, the trigger 180 can emit the sync signal periodically. In some examples, the trigger 180 can emit the sync signal at inconsistent times. By emitting the sync signal a plurality of times, the data from the plurality of data acquisition systems 195 can continually be synchronized. For example, if the data acquisition systems 195 are located in a dynamic environment, the distance from the master data acquisition system 200 may change. The periodic sync signal can be utilized to adjust the synchronization of the data from each of the data acquisition systems 195 as the environment changes.

Figure 2A:
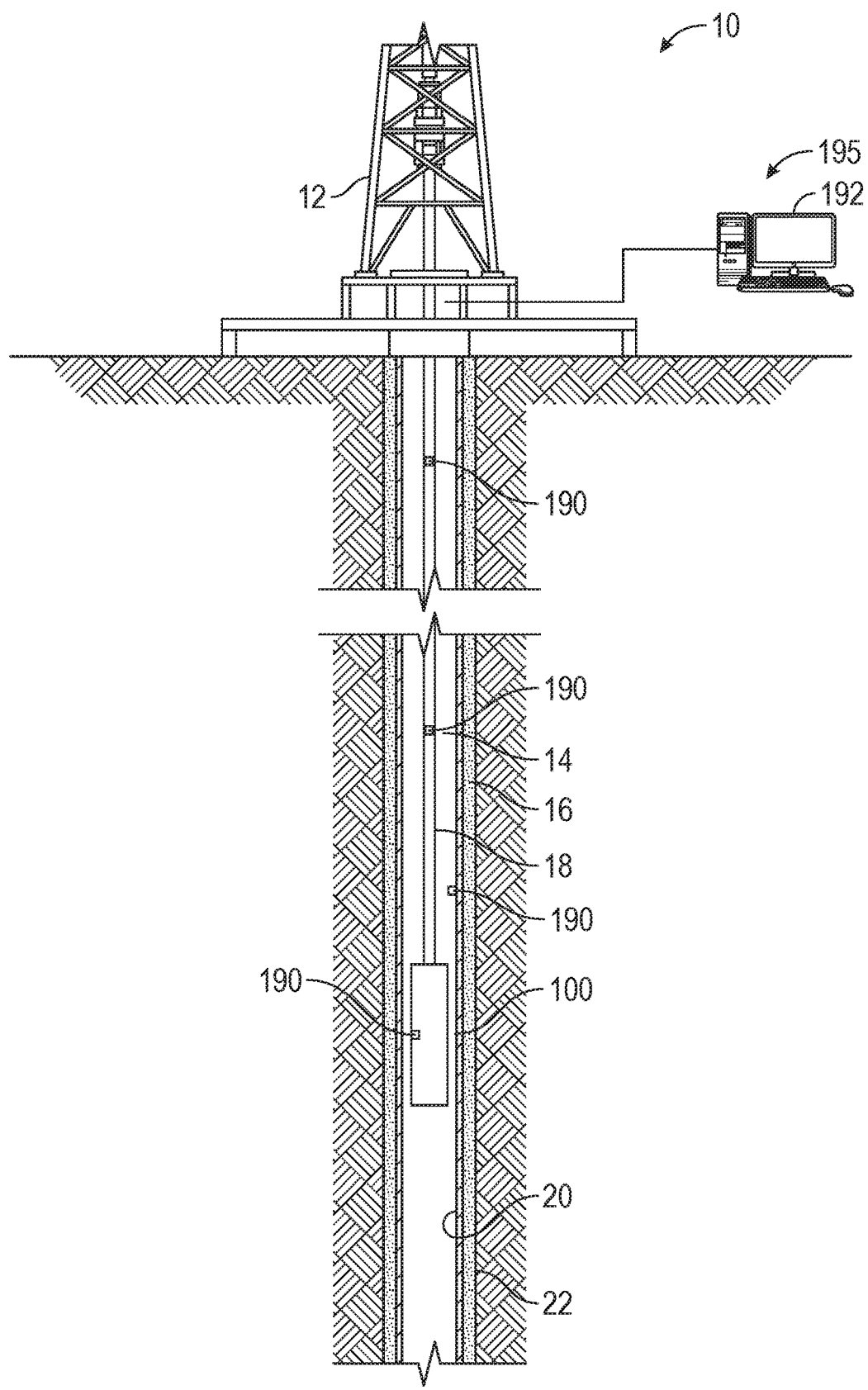
FIG. 2A is a diagram illustrating an exemplary environment for a data acquisition system according to the present disclosure.

Data acquisition systems 195 can be employed in an exemplary wellbore system 10 shown, for example, in FIG. 2A. A system 10 for anchoring a downhole tool 100 in a wellbore 14 includes a drilling rig 12 extending over and around the wellbore 14. The wellbore 14 is within an earth formation 22 and has a casing 20 lining the wellbore 14, the casing 20 is held into place by cement 16. A downhole tool 100 can be disposed within the wellbore 14 and moved up and/or down the wellbore 14 via a conduit 18 to a desired location. In some examples, the downhole tool 100 can include a drillbit to drill and/or mill the wellbore 14 in the formation 22. In at least one example, the downhole tool 100 can carry out logging and/or other operations.

The conduit 18 can be, for example, tubing-conveyed, wireline, slickline, work string, joint tubing, jointed pipe, pipeline, coiled tubing, and/or any other suitable means for conveying downhole tools 100 into a wellbore 14. In some examples, the conduit 18 can include electrical and/or fiber optic cabling for carrying out communications. The conduit 18 can be sufficiently strong and flexible to tether the downhole tool 100 through the wellbore 14, while also permitting communication through the conduit 18 to one or more of the processors, which can include local and/or remote processors. Moreover, power can be supplied via the conduit 18 to meet power requirements of the downhole tool 100. For slickline or coiled tubing configurations, power can be supplied downhole with a battery or via a downhole generator.

A data acquisition system 195 includes one or more sensors 190 communicatively coupled with a controller 192. The downhole tool 100 can include, for example, sensors 190, chokes, and/or valves. The sensors 190 in the downhole tool 100 can measure parameters such as temperature, pressure, and/or functioning parameters of downhole tool 100. In at least one example, as illustrated in FIG. 2A, one or more sensors 190 can be disposed within the conduit 18 at predetermined locations. The sensors 190 can measure parameters, for example regarding the fluid in the conduit 18, the depth, temperature, pressure, and/or deviation of the conduit 18. Additionally, the sensors 190 may measure parameters related to the wellbore 14 and/or fluid in the wellbore 14, such as flow rate, temperature, pressure, and/or composition. In at least one example, sensors 190 can be disposed within the wellbore 14, for example coupled with or disposed in the casing 20, as illustrated in FIG. 2A.

The sensors 190 can be communicatively coupled with the controller 192 which can receive and/or process the data received from the sensors 190. The sensors 190 can be communicatively coupled with one another. In at least one example, each of the sensors 190 can be coupled with respective controllers 192 such that each sensor 190 functions as individual data acquisition systems 195. As the sensors 190 are linked to the controller 192 for the individual data acquisition system 195, the data from the sensors 190 are able to be synchronized.

Figure 2B:
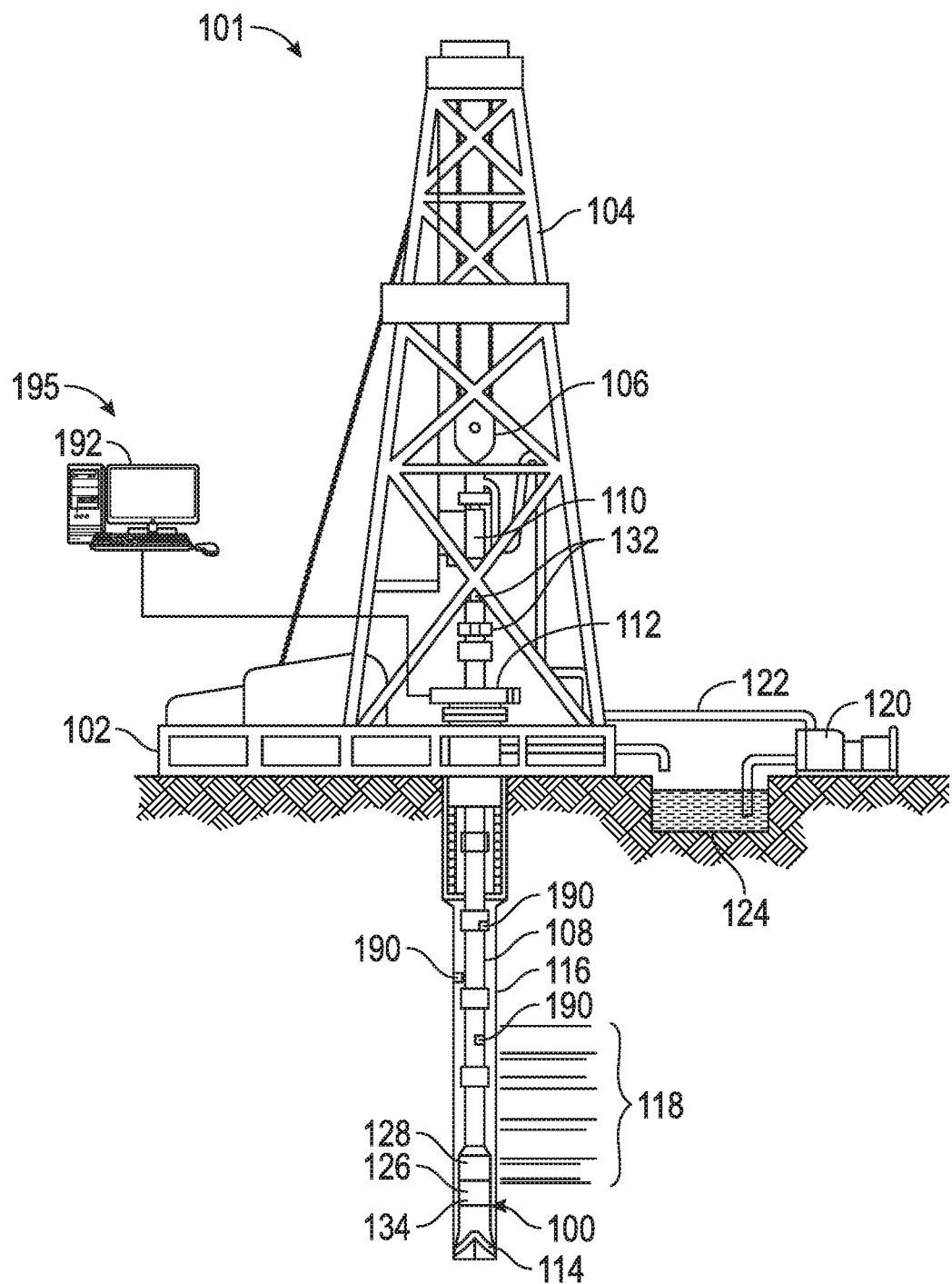
FIG. 2B is a diagram illustrating another exemplary environment for a data acquisition system.

FIG. 2B illustrates a schematic view of a Logging-While-Drilling (LWD) wellbore operating environment 101 in accordance with some examples of the present disclosure. Logging-While-Drilling typically incorporates sensors that acquire formation data. The drilling arrangement of FIG. 2B also exemplifies what is referred to as Measurement While Drilling (commonly abbreviated as MWD) which utilizes sensors to acquire data from which the wellbore's path and position in three-dimensional space can be determined.

As depicted in FIG. 2B, a drilling platform 102 can be equipped with a derrick 104 that supports a hoist 106 for raising and lowering a conduit 108. The conduit 108 can be, for example, tubing-conveyed, wireline, slickline, work string, joint tubing, jointed pipe, pipeline, coiled tubing, and/or any other suitable means for conveying downhole tools 100 into a wellbore 116. The hoist 106 suspends a top drive 110 suitable for rotating and lowering the conduit 108 through a well head 112. A downhole tool 100, such as a bottom-hole assembly, can be connected to the lower end of the conduit 108. The bottom-hole assembly 100 can include a drill bit 114. As the drill bit 114 rotates, the drill bit 114 creates a wellbore 116 that passes through various subterranean formations 118. A pump 120 circulates drilling fluid through a supply pipe 122 to top drive 110, down through the interior of drill string 108 and orifices in drill bit 114, back to the surface via the annulus around conduit 108, and into a retention pit 124. The drilling fluid transports cuttings from the wellbore 116 into the retention pit 124 and aids in maintaining the integrity of the wellbore 116. Various materials can be used for drilling fluid, including oil-based fluids and water-based fluids.

Logging tools 126 can be integrated into the bottom-hole assembly 100 near the drill bit 114. As the drill bit 114 extends the wellbore 116 through the formations 118, logging tools 126 collect measurements relating to various formation properties as well as the orientation of the tool and various other drilling conditions. The bottom-hole assembly 100 may also include a telemetry sub 128 to transfer measurement data to a surface receiver 132 and to receive commands from the surface. In some examples, the telemetry sub 128 communicates with a surface receiver 132 using mud pulse telemetry. In some examples, the telemetry sub 128 does not communicate with the surface, but rather stores logging data for later retrieval at the surface when the logging assembly is recovered.

Each of the logging tools 126 may include one or more tool components spaced apart from each other and communicatively coupled by one or more wires and/or other media. The logging tools 126 may also include one or more computing devices communicatively coupled with one or more of the tool components by one or more wires and/or other media. The one or more computing devices may be configured to control or monitor a performance of the tool, process logging data, and/or carry out one or more aspects of the methods and processes of the present disclosure.

In at least one example, one or more of the logging tools 126 may communicate with a surface receiver 132 by a wire, such as wired drillpipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drillpipe.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Similar to FIG. 2A, a data acquisition system 195 includes one or more sensors 190 communicatively coupled with a controller 192. In at least one example, as illustrated in FIG. 2B, one or more sensors 190 can be disposed within the conduit 108 at predetermined locations. The sensors 190 can measure parameters, for example regarding the fluid in the conduit 108, the depth, temperature, pressure, and/or deviation of the conduit 108. Additionally, the sensors 190 may measure parameters related to the wellbore 16 and/or fluid in the wellbore 116, such as flow rate, temperature, pressure, and/or composition. In at least one example, sensors 190 can be disposed within the wellbore 16. In some examples, similar to FIG. 2A, one or more sensors 190 can be disposed in and/or coupled to the downhole tool 100.

The sensors 190 can be communicatively coupled with the controller 192 which can receive and/or process the data received from the sensors 190. The sensors 190 can be communicatively coupled with one another. In at least one example, each of the sensors 190 can be coupled with respective controllers 192 such that each sensor 190 functions as individual data acquisition systems 195. As the sensors 190 are linked to the controller 192 for the individual data acquisition system 195, the data from the sensors 190 are able to be synchronized.

It should be noted that while FIGS. 2A and 2B generally depict land-based operations, those skilled in the art would readily recognize that the principles described herein are equally applicable to operations that employ floating or sea-based platforms and rigs, without departing from the scope of the disclosure. Also, even though FIGS. 1A and 1B depict vertical wellbores, the present disclosure is equally well-suited for use in wellbores having other orientations, including horizontal wellbores, slanted wellbores, multilateral wellbores or the like. Further, the wellbore system 10 can have a casing already implemented while, in other examples, the system 10 can also be used in open hole applications.

Figure 2C:
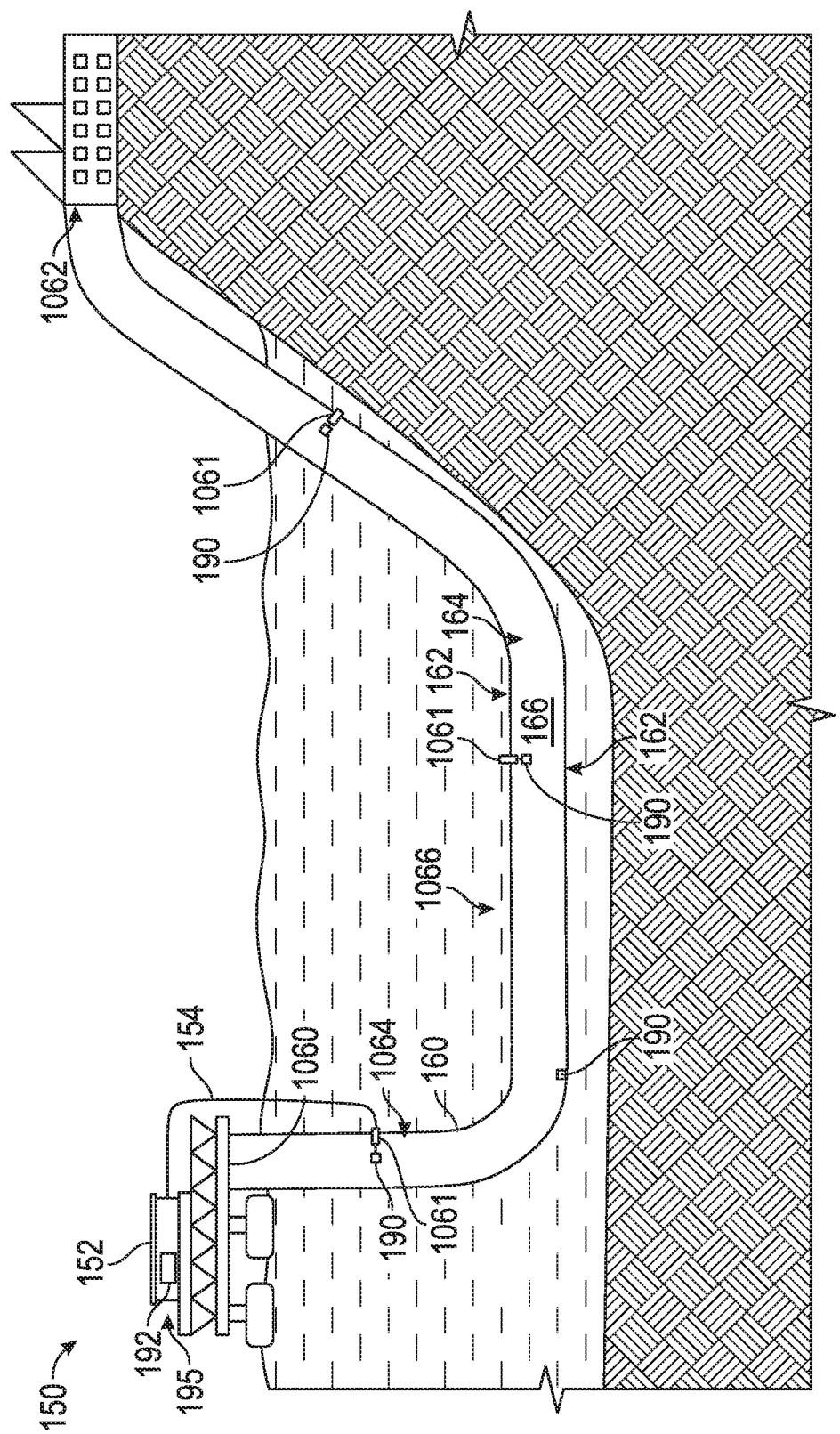
FIG. 2C is a diagram illustrating another exemplary environment for a data acquisition system.

Data acquisition systems 195 can also be utilized in an exemplary system 150 with a fluidic channel 160, shown, for example, in FIG. 2C. FIG. 2C illustrates a fluidic channel 160 having a first end 1060 and a second end 1062. The fluidic channel 160 illustrated in FIG. 2C is a pipeline. In other examples, the fluidic channel 160 can be, for example, a pipeline, a wellbore, a drill string, or any channel through which fluid flows. Each of the first end 1060 and the second end 1062 are open such that the first and second ends 1060, 1062 are accessible by an operator and fluid can flow through the open ends. In other examples, the second end 1062 of the fluidic channel 160 is closed such that fluid cannot flow through the second end 1062. In at least one example, the first and second ends 1060, 1062 can be located along any point of the fluidic channel 160. For example, the first end 1060 may be located in the middle of the fluidic channel 160. The first end 1060 is any entry point to gain access to the fluidic channel 160. As illustrated in FIG. 2C, the fluidic channel 160 has a vertical section 1064 and a horizontal section 1066. In other examples, the fluidic channel 160 can extend only in one direction or multiple directions along any axis.

The fluidic channel 160 has walls 162 which form an annulus 166 through which fluid 164 can be contained in and flow. The fluid 164 can be one fluid or more than one fluid. The fluid 164 can include, for example, water and/or oil. The fluid 164 can also substantially fill the entire fluidic channel 160. In other examples, the fluid 164 can partially fill the fluidic channel 160. The walls 162 of the fluidic channel 160 can form a cross-sectional shape such as substantially circular, ovoid, rectangular, or any other suitable shape. The walls 162 of the fluidic channel 160 can be made of any combination of plastics or metals, suitable to withstand fluid flow without corrosion and with minimal deformation.

The fluidic channel 160 can also include one or more ports 1061. The ports 1061 extend through the walls 162 of the fluidic channel 160. As such, the ports 1061 permit communication across the walls 162 from external the fluidic channel 160 to the annulus 166 within the fluidic channel 160.

Sensors 190 can be disposed within and/or be in communication with the fluidic channel 160. As illustrated in FIG. 2C, the sensors 190 can be inserted into the annulus 166 of the fluidic channel 160 through the ports 1061. In at least one example, the port 1061 may be pre-existing, so the fluidic channel 160 does not need to be modified or disrupted to position the sensor 190. In some examples, the sensor 190 can be disposed external to the fluidic channel 160. In some examples, the sensors 190 can be disposed within and/or coupled with the walls 162 of the fluidic channel 160 to measure parameters of the fluid 164 and/or the fluidic channel 160. For example, the sensors 190 can measure parameters of the fluidic channel 160 such as temperature, pressure, flow rate, fluid properties, and/or any other suitable parameters of the fluidic channel 160 and/or the fluid.

The system 150 includes a data acquisition system 195 which receives and processes data such that the data can be used and interpreted by a user. The data acquisition system 195 includes one or more sensors 190 communicatively coupled with a controller 192. The data acquisition system 195 is located in a data center 150, which can be proximate to the first end 1060 of the fluidic channel 160. The data center 150 may be above ground, under water, underground, or located at any point to collect data. For example, the data center 150 may be an underwater vehicle such as a submarine. In other examples, the data center 150 may be located on a platform, as illustrated in FIG. 2C.

The sensors 190 can be communicatively coupled with the controller 192 which can receive and/or process the data received from the sensors 190. The sensors 190 can be communicatively coupled with one another. As illustrated in FIG. 2C, the controller 192 can be communicatively coupled with the sensors 190 by transmission system 115. The transmission system 115 can be wireline, optical fiber, wirelessly such as through the cloud or Bluetooth, or any other suitable method to transmit data. In at least one example, each of the sensors 190 can be coupled with respective controllers 192 such that each sensor 190 functions as individual data acquisition systems 195. As the sensors 190 are linked to the controller 192 for the individual data acquisition system 195, the data from the sensors 190 within the individual data acquisition system 195 is able to be synchronized.

Figure 3:
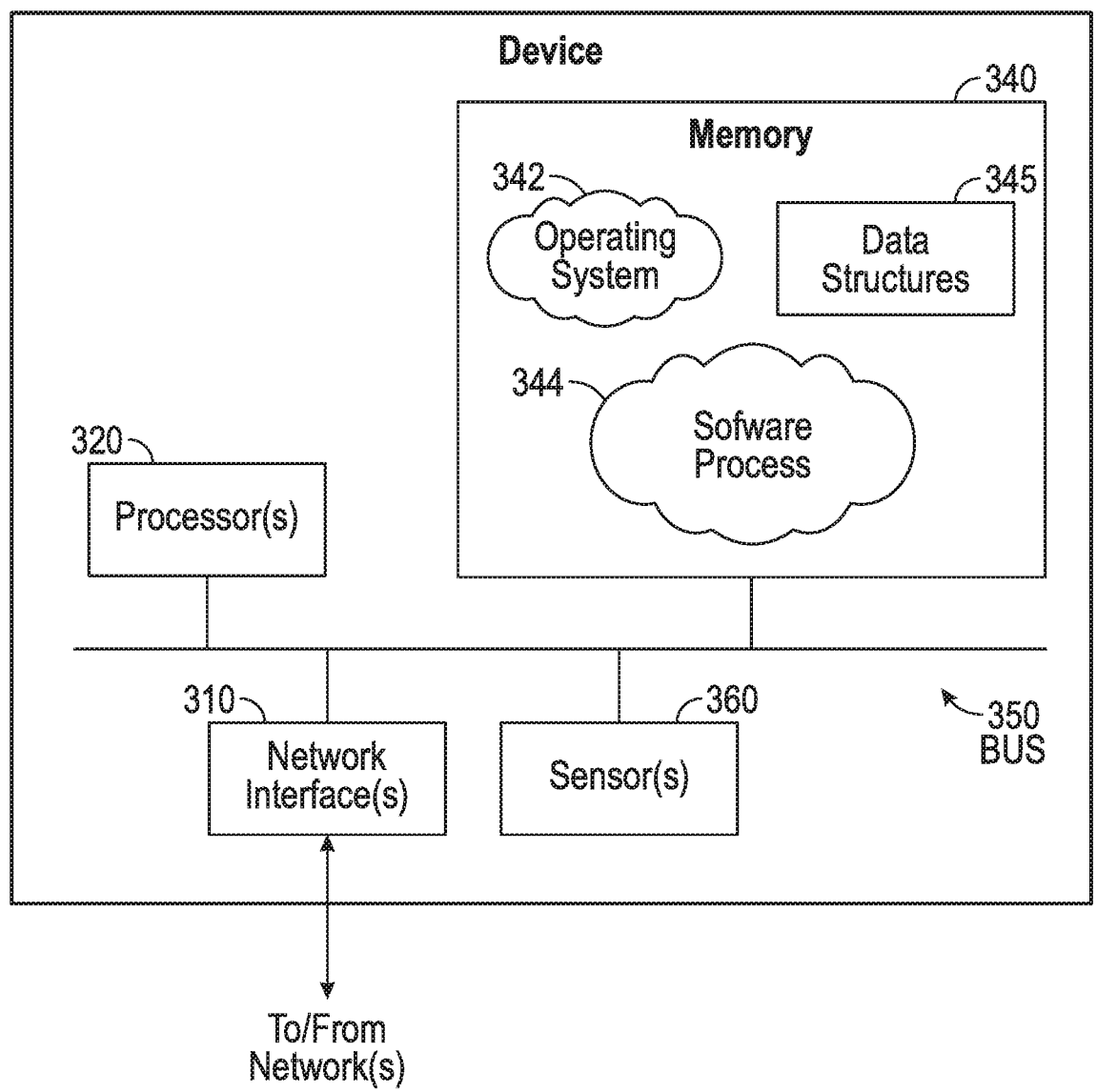
FIG. 3 is a diagram of a controller which may be employed as shown in FIGS. 1A-2C.

FIG. 3 is a block diagram of an exemplary controller 192, 250. In operation, controller 192, 250 communicates with one or more of the above-discussed components, for example the sensors 190, and may also be configured to communication with remote devices/systems.

As shown, controller 192, 250 includes hardware and software components such as network interfaces 310, at least one processor 320, sensors 360 and a memory 340 interconnected by a system bus 350. Network interface(s) 310 can include mechanical, electrical, and signaling circuitry for communicating data over communication links, which may include wired or wireless communication links. Network interfaces 310 are configured to transmit and/or receive data using a variety of different communication protocols, as will be understood by those skilled in the art.

Processor 320 represents a digital signal processor (e.g., a microprocessor, a microcontroller, or a fixed-logic processor, etc.) configured to execute instructions or logic to perform tasks in a wellbore environment. Processor 320 may include a general purpose processor, special-purpose processor (where software instructions are incorporated into the processor), a state machine, application specific integrated circuit (ASIC), a programmable gate array (PGA) including a field PGA, an individual component, a distributed group of processors, and the like. Processor 320 typically operates in conjunction with shared or dedicated hardware, including but not limited to, hardware capable of executing software and hardware. For example, processor 320 may include elements or logic adapted to execute software programs and manipulate data structures 345, which may reside in memory 340.

Sensors 360, which may include sensors 190, typically operate in conjunction with processor 320 to perform measurements, and can include special-purpose processors, detectors, transmitters, receivers, and the like. In this fashion, sensors 360 may include hardware/software for generating, transmitting, receiving, detection, logging, and/or sampling magnetic fields, seismic activity, and/or acoustic waves, temperature, pressure, or other parameters.

Memory 340 comprises a plurality of storage locations that are addressable by processor 320 for storing software programs and data structures 345 associated with the embodiments described herein. An operating system 342, portions of which may be typically resident in memory 340 and executed by processor 320, functionally organizes the device by, inter alia, invoking operations in support of software processes and/or services 344 executing on controller 192, 250. These software processes and/or services 344 may perform processing of data and communication with controller 192, 250, as described herein. Note that while process/service 244 is shown in centralized memory 340, some examples provide for these processes/services to be operated in a distributed computing network.

It will be apparent to those skilled in the art that other processor and memory types, including various computer-readable media, may be used to store and execute program instructions pertaining to the fluidic channel evaluation techniques described herein. Also, while the description illustrates various processes, it is expressly contemplated that various processes may be embodied as modules having portions of the process/service 244 encoded thereon. In this fashion, the program modules may be encoded in one or more tangible computer readable storage media for execution, such as with fixed logic or programmable logic (e.g., software/computer instructions executed by a processor, and any processor may be a programmable processor, programmable digital logic such as field programmable gate arrays or an ASIC that comprises fixed digital logic. In general, any process logic may be embodied in processor 320 or computer readable medium encoded with instructions for execution by processor 320 that, when executed by the processor, are operable to cause the processor to perform the functions described herein.

Figure 4:
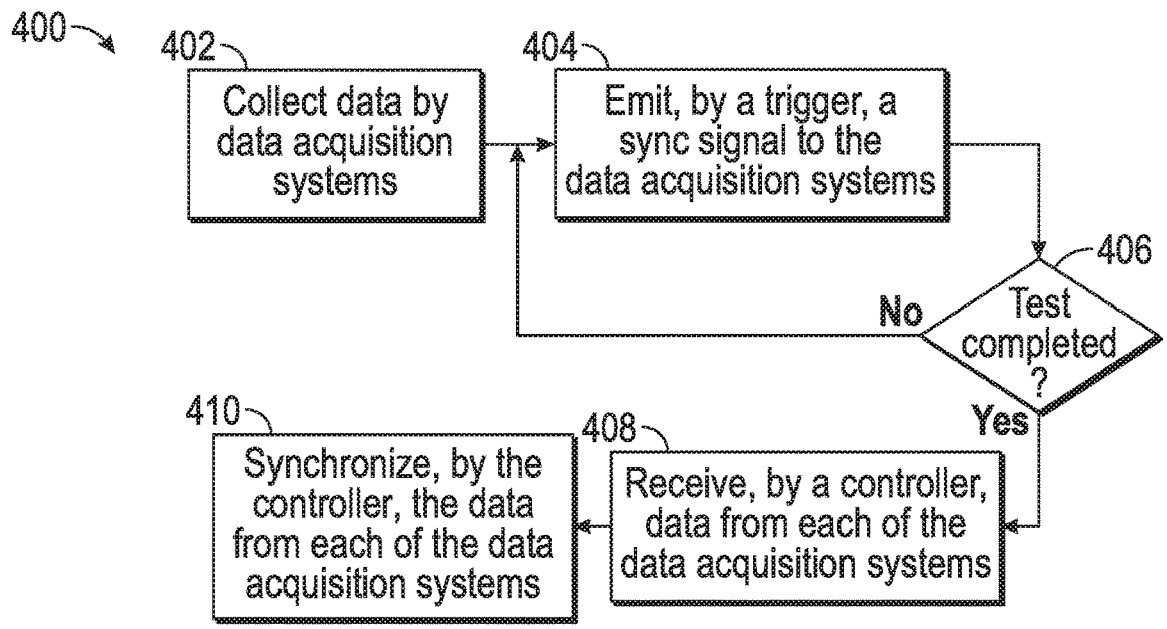
FIG. 4 is a flow chart of a method to synchronize data from a plurality of data acquisition systems.

Referring to FIG. 4, a flowchart is presented in accordance with an example embodiment. The method 400 is provided by way of example, as there are a variety of ways to carry out the method. The method 400 described below can be carried out using the configurations illustrated in FIGS. 1A-3 and 5A-6, for example, and various elements of these figures are referenced in explaining example method 400. Each block shown in FIG. 4 represents one or more processes, methods or subroutines, carried out in the example method 400. Furthermore, the illustrated order of blocks is illustrative only and the order of the blocks can change according to the present disclosure. Additional blocks may be added or fewer blocks may be utilized, without departing from this disclosure. The example method 400 can begin at block 402.

At block 402, data is collected by a plurality of data acquisition systems. Each of the plurality of data acquisition systems includes one or more sensors communicatively coupled with one another. The sensors can measure parameters of at least one of the following: a formation, a wellbore, a conduit disposed in a wellbore, and/or a pipeline. As each of the plurality of data acquisition systems may be in an environment where wired and/or wireless communication with a master data acquisition system is not feasible or clear, for example at too great a distance from the master data acquisition system, the data for each of the data acquisition systems may be temporally misaligned. Accordingly, the data needs to be processed ex post-facto to align the data from the plurality of data acquisition systems.

To align and synchronize the data from each of the plurality of data acquisition systems, at block 404, a trigger emits a sync signal to the data acquisition systems. In at least one example, the sync signal can be sent within a transmission line connected to each of the data acquisition systems. In some examples, the transmission line can be the same for each of the data acquisition systems. In some examples, each or any number of the data acquisition system may be connected to different transmission lines.

In some examples, the sync signal can be an acoustic signal. In some examples, the sync signal can include at least one of the following: an acoustic pulse, an ultrasound signal, and/or a pressure wave.

In at least one example, the trigger can be communicatively coupled with the controller such that the controller receives the timing that the sync signal is emitted. In at least one example, the controller may instruct the trigger to emit the sync signal.

In at least one example, the trigger can emit the sync signal periodically. In some examples, the trigger can emit the sync signal at inconsistent times. By emitting the sync signal a plurality of times, the data from the plurality of data acquisition systems can continually be synchronized. For example, if the data acquisition systems are located in a dynamic environment, the distance from the master data acquisition system may change. The periodic sync signal can be utilized to adjust the synchronization of the data from each of the data acquisition systems as the environment changes.

Figure 5A:
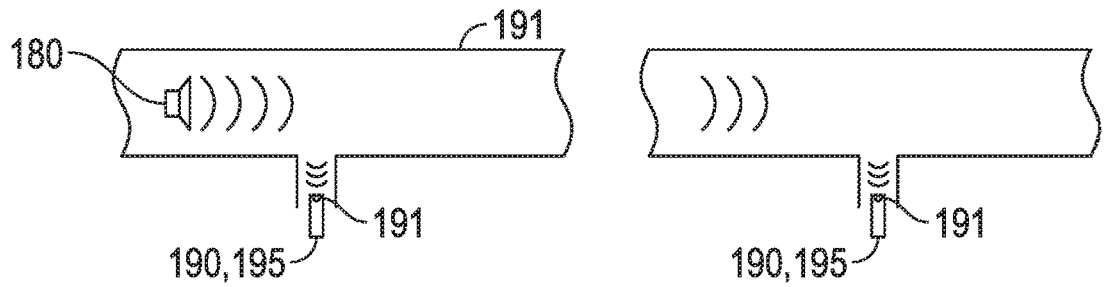
FIG. 5A is a diagram illustrating a trigger emitting a sync signal to a plurality of data acquisition systems.
Figure 5B:
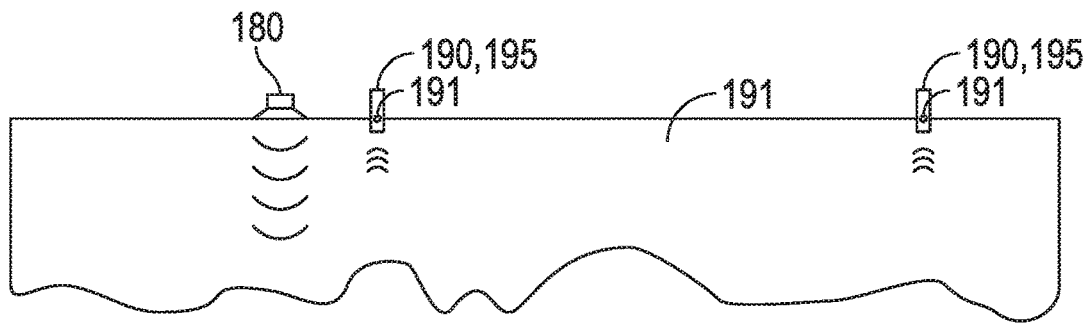
FIG. 5B is a diagram illustrating another example of a trigger emitting a sync signal to a plurality of data acquisition systems.

For example, as illustrated in FIGS. 5A and 5B, the trigger 180 emits the sync signal to be passed through transmission line 191. The sync signal is received by the data acquisition systems 195 in communication with the transmission line 191. The sync signal is received by the signal sensor 191 of the data acquisition systems 195. As illustrated in FIG. 5A, the transmission line 191 can be, for example, a pipeline. As illustrated in FIG. 5B, the transmission line 191 can be, for example, the ground or formation.

At block 406, a controller determines whether the test is completed such that each of the data acquisition systems received the sync signal. If the test is not completed, the method can return to block 404 such that another sync signal is emitted by the trigger. If the test is completed, the method can proceed to block 408.

Figure 6:
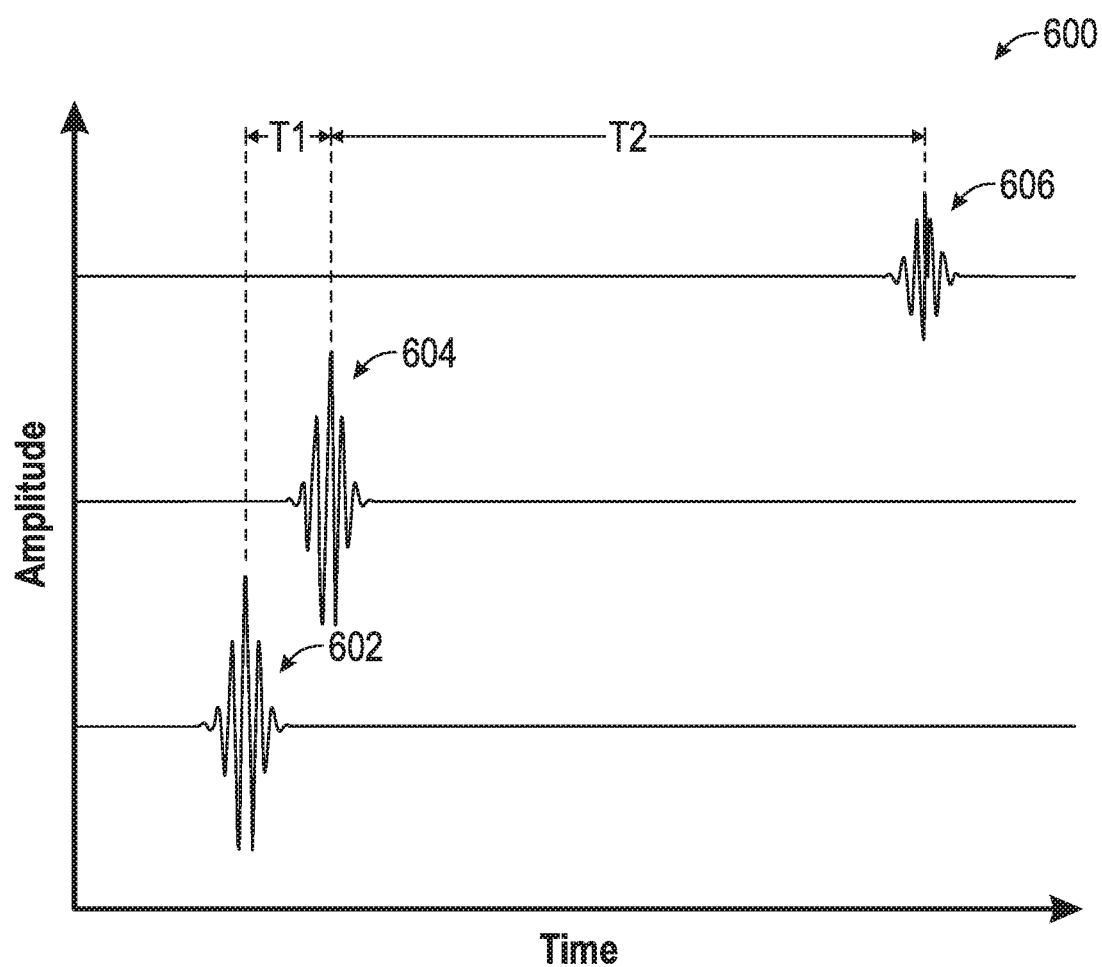
FIG. 6 is a chart illustrating the time differentials between data acquisition systems receiving the sync signal.

At block 408, a controller of the master data acquisition system receives data from each of the data acquisition systems. The controller of the master data acquisition system receives and processes the data from the plurality of data acquisition systems to be utilized by a user. The data from each of the data acquisition systems includes the sensed sync signal. FIG. 6 is a chart illustrating the time differentials between data acquisition systems receiving the sync signal. As illustrated in FIG. 6, the sensed sync signals 602, 604, 606 are temporally misaligned.

At block 410, the data from each of the data acquisition systems is synchronized by the controller of the master data acquisition system. The data can be synchronized by aligning the sensed sync signal for each of the plurality of data acquisition systems. In some examples, the synchronizing of the data can include shifting the data from each of the plurality of data acquisition systems, trimming the data, and/or combining the data.

Numerous examples are provided herein to enhance understanding of the present disclosure. A specific set of statements are provided as follows.

Statement 1: A master data acquisition system (DAQ) is disclosed comprising: a trigger which emits a sync signal to be sensed by each of a plurality of DAQs; and a controller communicatively coupled with each of the plurality of DAQs, wherein the controller receives data from each of the plurality of DAQs, the data for each of the plurality of DAQs including the sensed sync signal, wherein the controller synchronizes the data from each of the plurality of DAQs by aligning the sensed sync signal for each of the plurality of DAQs.

Statement 2: A master DAQ is disclosed according to Statement 1, wherein the sync signal is an acoustic signal.

Statement 3: A master DAQ is disclosed according to Statements 1 or 2, wherein the acoustic signal includes at least one of the following: an acoustic pulse, an ultrasound signal, and/or a pressure wave.

Statement 4: A master DAQ is disclosed according to any of preceding Statements 1-3, wherein each of the plurality of DAQs is connected to a transmission line, wherein the trigger emits the sync signal within the transmission line.

Statement 5: A master DAQ is disclosed according to Statement 4, wherein the transmission line is substantially homogenous, wherein the transmission line includes at least one of the following: fluid, rock, metal, and/or concrete.

Statement 6: A master DAQ is disclosed according to any of preceding Statements 1-5, wherein the synchronization of the data by the controller includes shifting the data from each of the plurality of DAQs, trimming the data, and combining the data.

Statement 7: A master DAQ is disclosed according to any of preceding Statements 1-6, wherein each of the plurality of DAQs includes one or more sensors communicatively coupled with one another.

Statement 8: A master DAQ is disclosed according to any of preceding Statements 1-7, wherein the trigger emits the sync signal periodically.

Statement 9: A system is disclosed comprising: a plurality of data acquisition systems (DAQs), each of the plurality of DAQs including a signal sensor; a master DAQ including a trigger which emits a sync signal sensed by the signal sensor of each of the plurality of DAQs; and a controller communicatively coupled with each of the plurality of DAQs, wherein the controller receives data from each of the plurality of DAQs, the data for each of the plurality of DAQs include the sensed sync signal, wherein the controller synchronizes the data from each of the plurality of DAQs by aligning the sensed sync signal for each of the plurality of DAQs.

Statement 10: A system is disclosed according to Statement 9, wherein the sync signal is an acoustic signal.

Statement 11: A system is disclosed according to Statements 9 or 10, wherein the acoustic signal includes at least one of the following: an acoustic pulse, an ultrasound signal, and/or a pressure wave.

Statement 12: A system is disclosed according to any of preceding Statements 9-11, wherein each of the plurality of DAQs is connected to a transmission line, wherein the trigger emits the sync signal within the transmission line.

Statement 13: A system is disclosed according to Statement 12, wherein the transmission line is substantially homogenous, wherein the transmission line includes at least one of the following: fluid, rock, metal, and/or concrete.

Statement 14: A system is disclosed according to any of preceding Statements 9-13, wherein the synchronization of the data by the controller includes shifting the data from each of the plurality of DAQs, trimming the data, and combining the data.

Statement 15: A system is disclosed according to any of preceding Statements 9-14, wherein each of the plurality of DAQs includes one or more sensors communicatively coupled with one another.

Statement 16: A system is disclosed according to Statement 15, wherein the one or more sensors measure parameters of at least one of the following: a formation, a wellbore, a conduit disposed in a wellbore, and/or a pipeline.

Statement 17: A system is disclosed according to any of preceding Statements 9-16, wherein the trigger emits the sync signal periodically.

Statement 18: A method is disclosed comprising: emitting, by a trigger, a sync signal to a plurality of data acquisition systems (DAQs); receiving, by a controller, data from each of the plurality of DAQs, the data for each of the plurality of DAQs including the sensed sync signal; and synchronizing, by the controller, the data from each of the plurality of DAQs by aligning the sensed sync signal for each of the plurality of DAQs.

Statement 19: A method is disclosed according to Statement 18, wherein the synchronization of the data includes: shifting the data from each of the plurality of DAQs; trimming the data; and combining the data.

Statement 20: A method is disclosed according to Statements 18 or 19, wherein each of the plurality of DAQs includes one or more sensors communicatively coupled with one another, wherein the one or more sensors measure parameters of at least one of the following: a formation, a wellbore, a conduit disposed in a wellbore, and/or a pipeline.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A master data acquisition system (DAQ) comprising:
   a trigger which emits a sync signal to be sensed by each of a plurality of DAQs that are associated with a manmade fluidic channel; and
   a controller communicatively coupled with each of the plurality of DAQs associated with the manmade fluidic channel, wherein:
      the controller receives data from each of the plurality of DAQs, the data for each of the plurality of DAQs including information associated with the sensed sync signal, and
      the controller synchronizes the data from each of the plurality of DAQs by aligning the information associated with the sensed sync signal for each of the plurality of DAQs.

2. The master DAQ of claim 1, wherein the sync signal is an acoustic signal.

3. The master DAQ of claim 1, wherein the acoustic signal includes at least one of the following: an acoustic pulse, an ultrasound signal, or a pressure wave.

4. The master DAQ of claim 1, wherein each of the plurality of DAQs is connected to a transmission line, wherein the trigger emits the sync signal within the transmission line.

5. The master DAQ of claim 4, wherein the transmission line is substantially homogenous, wherein the transmission line includes at least one of the following: fluid, rock, metal, or concrete.

6. The master DAQ of claim 1, wherein the synchronization of the data by the controller includes shifting the data from each of the plurality of DAQs, trimming the data, and combining the data.

7. The master DAQ of claim 1, wherein each of the plurality of DAQs includes one or more sensors communicatively coupled with one another.

8. The master DAQ of claim 1, wherein the trigger emits the sync signal periodically.

9. A system comprising:
   a plurality of data acquisition systems (DAQs) that are associated with a manmade fluidic channel, each of the plurality of DAQs associated with the manmade fluidic channel including a signal sensor; and
   a master DAQ including:
      a trigger which emits a sync signal sensed by the signal sensor of each of the plurality of DAQs; and
      a controller communicatively coupled with each of the plurality of DAQs, wherein:
         the controller receives data from each of the plurality of DAQs, the data for each of the plurality of DAQs include information associated with the sensed sync signal, and
         the controller synchronizes the data from each of the plurality of DAQs by aligning the information associated with the sensed sync signal for each of the plurality of DAQs.

10. The system of claim 9, wherein the sync signal is an acoustic signal.

11. The system of claim 9, wherein the acoustic signal includes at least one of the following: an acoustic pulse, an ultrasound signal, or a pressure wave.

12. The system of claim 9, wherein each of the plurality of DAQs is connected to a transmission line, wherein the trigger emits the sync signal within the transmission line.

13. The system of claim 12, wherein the transmission line is substantially homogenous, wherein the transmission line includes at least one of the following: fluid, rock, metal, or concrete.

14. The system of claim 9, wherein the synchronization of the data by the controller includes shifting the data from each of the plurality of DAQs, trimming the data, and combining the data.

15. The system of claim 9, wherein each of the plurality of DAQs includes one or more sensors communicatively coupled with one another.

16. The system of claim 15, wherein the one or more sensors measure parameters of at least one of the following: a formation, a wellbore, a conduit disposed in a wellbore or a pipeline.

17. The system of claim 9, wherein the trigger emits the sync signal periodically.

18. A method comprising:
emitting, by a trigger, a sync signal to a plurality of data acquisition systems (DAQs) that are associated with a manmade fluidic channel;
receiving, by a controller, data from each of the plurality of DAQs associated with the manmade fluidic channel, the data for each of the plurality of DAQs including information associated with the sensed sync signal; and
synchronizing, by the controller, the data from each of the plurality of DAQs by aligning the information associated with the sensed sync signal for each of the plurality of DAQs.

19. The method of claim 18, wherein the synchronizing of the data includes:
shifting the data from each of the plurality of DAQs;
trimming the data; and
combining the data.

20. The method of claim 18, wherein each of the plurality of DAQs includes one or more sensors communicatively coupled with one another, wherein the one or more sensors measure parameters of at least one of the following: a formation, a wellbore, a conduit disposed in a wellbore, or a pipeline.

* * * * *